(12) United States Patent
Li et al.

(10) Patent No.: US 8,312,227 B2
(45) Date of Patent: Nov. 13, 2012

(54) METHOD AND APPARATUS FOR MPI PROGRAM OPTIMIZATION

(75) Inventors: Eric Li, Beijing (CN); Wenlong Li, Beijing (CN); Jiulong Shan, Beijing (CN); Yurong Chen, Beijing (CN); Yimin Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 306 days.

(21) Appl. No.: 12/598,597

(22) PCT Filed: May 31, 2007

(86) PCT No.: PCT/CN2007/001747
§ 371 (c)(1),
(2), (4) Date: Feb. 25, 2010

(87) PCT Pub. No.: WO2008/144960
PCT Pub. Date: Dec. 4, 2008

(65) Prior Publication Data
US 2010/0161911 A1      Jun. 24, 2010

(51) Int. Cl.
G06F 12/00       (2006.01)
(52) U.S. Cl. .................................................. 711/147
(58) Field of Classification Search .............. 711/147, 711/213
See application file for complete search history.

(56) References Cited

U.S. PATENT DOCUMENTS

| | | | |
|---|---|---|---|
| 5,555,396 A | 9/1996 | Alferness et al. | |
| 6,799,317 B1 | 9/2004 | Heywood et al. | |
| 7,293,267 B1 * | 11/2007 | Fresko | 717/166 |
| 8,108,876 B2 * | 1/2012 | Arimilli et al. | 718/105 |
| 8,190,807 B2 * | 5/2012 | Reid et al. | 711/3 |
| 2004/0107419 A1 | 6/2004 | Blackmore et al. | |
| 2006/0080668 A1 | 4/2006 | Blackmore et al. | |
| 2006/0225031 A1 * | 10/2006 | Petersen et al. | 717/104 |
| 2006/0259571 A1 * | 11/2006 | Talluri et al. | 709/213 |
| 2007/0192267 A1 * | 8/2007 | Hawkins et al. | 706/52 |
| 2007/0192269 A1 * | 8/2007 | Saphir et al. | 706/52 |
| 2008/0114937 A1 * | 5/2008 | Reid et al. | 711/117 |
| 2008/0127140 A1 * | 5/2008 | Quan et al. | 717/146 |

(Continued)

FOREIGN PATENT DOCUMENTS

| | | |
|---|---|---|
| WO | WO-2005/033882 A2 | 4/2005 |
| WO | WO-2008/144960 A1 | 12/2008 |

OTHER PUBLICATIONS

Xiaochun Zhao, Written Opinion of the International Searching Authority, Mar. 13, 2008, 6 pages, PCT/CN2007/001747, The State Intellectual Property Office, Beijing, China.

(Continued)

Primary Examiner — John Lane
(74) Attorney, Agent, or Firm — Blakely, Sokoloff, Taylor & Zafman LLP

(57) ABSTRACT

Machine readable media, methods, apparatus and system for MPI program optimization. In some embodiments, shared data may be retrieved from a message passing interface (MPI) program, wherein the shared data is sharable by a plurality of processes. Then, the shared data may be allocated to a shared memory, wherein the shared memory is accessible by the plurality of processes. A single copy of the shared data may be maintained in the shared data in a global buffer of the processes of the plurality of processes can read or write the single copy of the shared data from or to the shared memory.

15 Claims, 3 Drawing Sheets

U.S. PATENT DOCUMENTS

| | | | |
|---|---|---|---|
| 2008/0148095 A1* | 6/2008 | Perdomo et al. | 714/6 |
| 2008/0183647 A1* | 7/2008 | Hawkins et al. | 706/12 |
| 2008/0184195 A1* | 7/2008 | Lee et al. | 717/107 |
| 2009/0307669 A1* | 12/2009 | Garst et al. | 717/130 |
| 2011/0055487 A1* | 3/2011 | Sapronov et al. | 711/130 |

OTHER PUBLICATIONS

International Search Report, PCT/CN2007/001747, 2 pages.

Ellen Moyse, International Preliminary Report on Patentability, Dec. 1, 2009, 7 pages, PCT/CN2007/001747, The International Bureau of WIPO, Geneva, Switzerland.

\* cited by examiner

METHOD AND APPARATUS FOR MPI PROGRAM OPTIMIZATION

CROSS REFERENCE TO RELATED APPLICATION

This patent application is a U.S. National Phase application under 35 U.S.C. §371 of International Application No. PCT/CN2007/001747, filed on May 31, 2007, entitled METHOD AND APPARATUS FOR MPI PROGRAM OPTIMIZATION.

BACKGROUND

Message passing interface (MPI) may be a widely used programming model for high performance computing. Originally, MPI may be designed for communication among nodes running a parallel program on a distributed memory system. With the development of multiprocessors (MP) running individual processes, the use of MPI may be extended to communication among processes on a shared memory system.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE PREFERRED EMBODIMENTS

The following description describes techniques for MPI program optimization. In the following description, numerous specific details such as logic implementations, pseudo-code, means to specify operands, resource partitioning/sharing/duplication implementations, types and interrelationships of system components, and logic partitioning/integration choices are set forth in order to provide a more thorough understanding of the current invention. However, the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, that may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.) and others.

Figure 1:
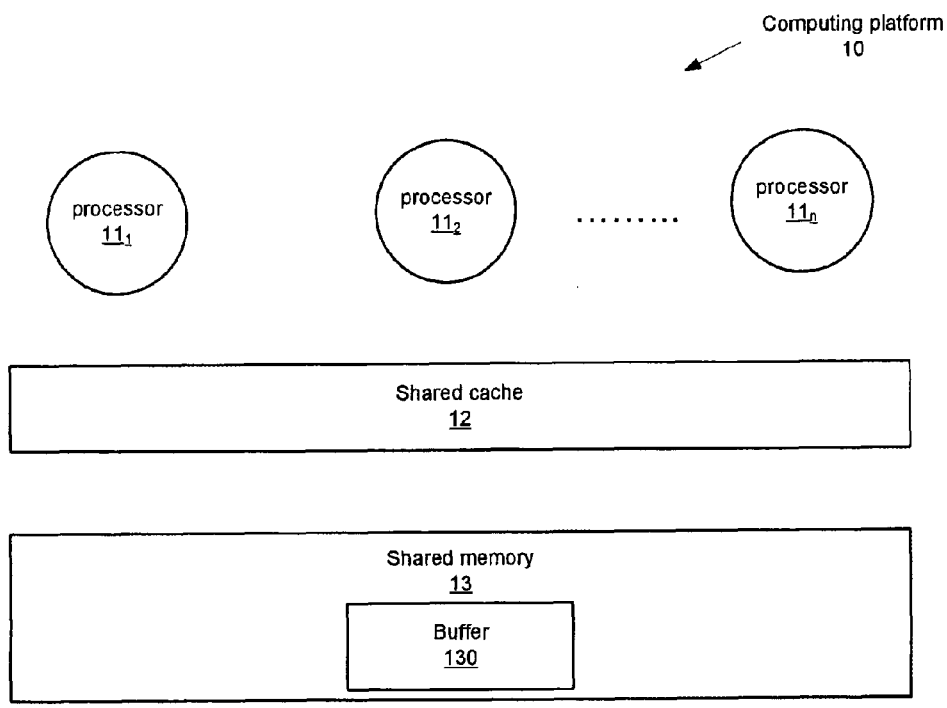
FIG. 1 illustrates an embodiment of a MP computing platform using MPI programs.

FIG. 1 shows an embodiment of a MP computing platform. Platform 10 may comprise a plurality of processors $11_1$-$11_n$, a shared cache 12 and a shared memory 13, and possibly other components for data transceiving and/or data processing.

Processors $11_1$-$11_n$ may be used to run individual processes. Shared cache 12 and shared memory 13 may be associated with and sharable by processors $11_1$-$11_n$. Shared cache 12 may be a bridge between processors $11_1$-$11_n$ and shared memory 13 and may allow instructions and data transferred from shared memory 13 to be read or written by processors $11_1$-$11_n$ at a faster speed.

It should be appreciated that computing platform 10 may apply cache hierarchy architecture, namely, each of processors $111$-$11n$ may be associated with a first level cache (not shown), a group of processors may be associated with a second level cache (not shown) and shared cache 12 may be a shared last level cache (LLC) that may be associated with all of processors $11_1$-$11_n$.

MPI may be a de facto standard for communication among the processes running a parallel program on a shared memory system. Conventionally, the parallel program may adopt single program multiple data (SPMD) pattern, namely, all processes running on processors may use the same program but each may has its own data. Therefore, multiple copies of the data may be maintained in the memory system, which could be a big challenge for memory bandwidth and cache performance. Conventionally, MPI standard may provide various patterns for data communication among the processes, for example, point-to-point communications or collective communications. However, no matter which communication pattern is used, a complete copy of data may be transferred between processes, which may create redundant data for each process.

Figure 2:
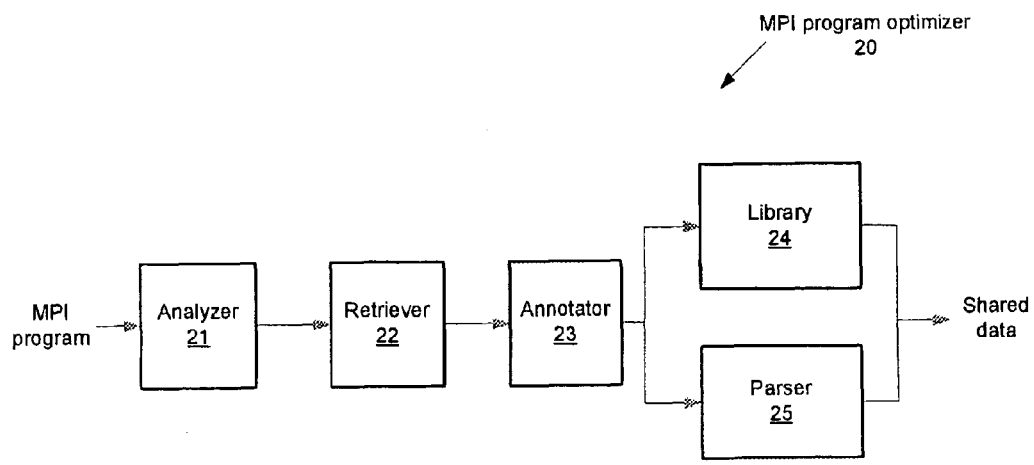
FIG. 2 illustrates an embodiment of a MPI program optimizer.

FIG. 2 illustrates an embodiment of a MPI program optimizer 20. MPI program optimizer 20 may optimize performance of data communication between processes. MPI program optimizer 20 may comprise analyzer 21, retriever 22, annotator 23, library 24, and parser 25.

Analyzer 21 may analyze a MPI program to detect if there is data from the MPI program sharable by a number or all of the processes running on processors $11_1$-$11_n$. Various applications may determine various types of data sharable by the processes. For an information extraction application that may be used to locate boundaries of sentences and extract name entities, dictionary data may be sharable by the processes. For an MFold algorithm application that may be used to predict Ribonucleic acid (RNA) secondary structure, matrix variables may be sharable by the processes. For an integer sort application that may be a part of parallel benchmark NPB, variables used for functions such as MPI_Allreduce, MPI_Alltall and MPI_Alltoallv may be sharable by the processes.

Analyzer 21 may further analyze the MPI communication pattern for the shared data. As stated above, MPI standard may define various communication patterns, such as point-to-point communications or collective communications.

Retriever 22 may retrieve the shared data from the MPI program to provide a shared data list. Annotator 23 may annotate the shared data list with a shared directive. For example, annotator 23 may annotate the shared data with a directive "#pragma shmpi shared".

Functionalities of analyzer 21, retriever 22 and annotator 23 may be implemented by a programmer, a complier or other devices for compiling the MPI program.

Library 24 may identify the shared data from the MPI program based upon the shared directive. Library 24 may further allocate the shared data in shared memory 13, e.g., by using inter-process communication (IPC)/shared memory (shm) routines. For data allocation, library 24 may first assign a buffer (buffer 130 of FIG. 1) from shared memory 13 to locate the shared data, in which buffer 130 may comprise a plurality of storage units with consecutive logical addresses. Then, library 24 may map a memory address of buffer 130 to the processes that may use the shared data. Compared with conventional data replication, only one copy of the shared data may be maintained in shared memory 13.

Parser 25 may transform the MPI communication pattern for the shared data into single-data-copy-access pattern. More specifically, processes may read or write the single copy of the shared data from or to the dedicated buffer 130 of shared memory 13. If a process needs the shared data updated by another process, the process can read the shared data from shared memory 13 after the another process completes updating and writing the shared data into shared memory 13. If two or more processes read the same shared data, they can do it simultaneously.

Figure 3:
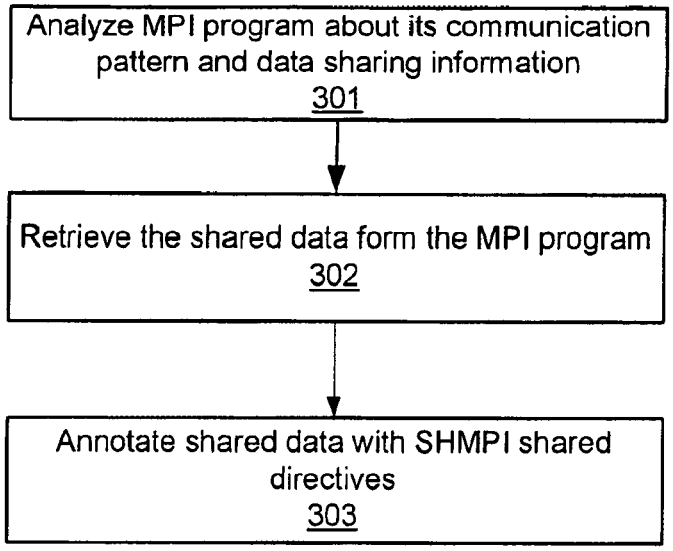
FIG. 3 illustrates an embodiment of a method of MPI program optimization during the compiling stage.

FIG. 3 shows an embodiment of a method of MPI program optimization during the compiling stage. In block 301, analyzer 21 may analyze the MPI program about its communication pattern and data sharing information. Analyzer 21 may analyze what kind of data sharable by the processes based upon the program application. In block 302, retriever 22 may retrieve the shared data from the MPI program. In block 303, annotator 23 may annotate the shared data with a shared directive, e.g., "#pragma shmpi shared" directive.

It should be appreciated that the above method can be implemented in other stages.

Figure 4:
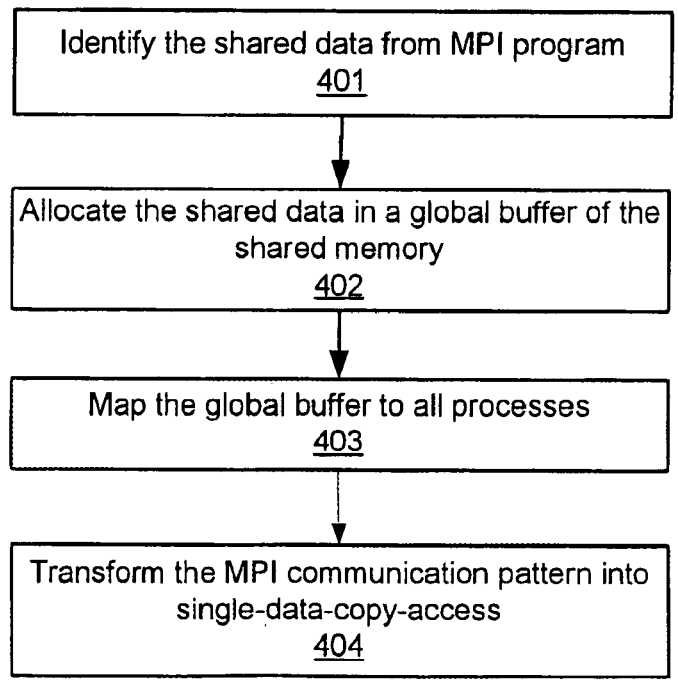
FIG. 4 illustrates an embodiment of a method of MPI program optimization during the runtime stage.

FIG. 4 shows an embodiment of a method of MPI program optimization during the runtime stage. In block 401, library 24 may identify the shared data from the MPI program based upon the shared directive. In block 402, library 24 may allocate the shared data in buffer 130 of shared memory 13. In block 403, library 24 may map buffer 130 to the processes that may share the data. For example, library 24 may map the address of buffer 130 to the processes. In block 404, parser 25 may transform the MPI communication patter for the shared data into the above-sated single-data-copy-access pattern.

It should be appreciated that the above method can be implemented in other stages.

Figure 5:
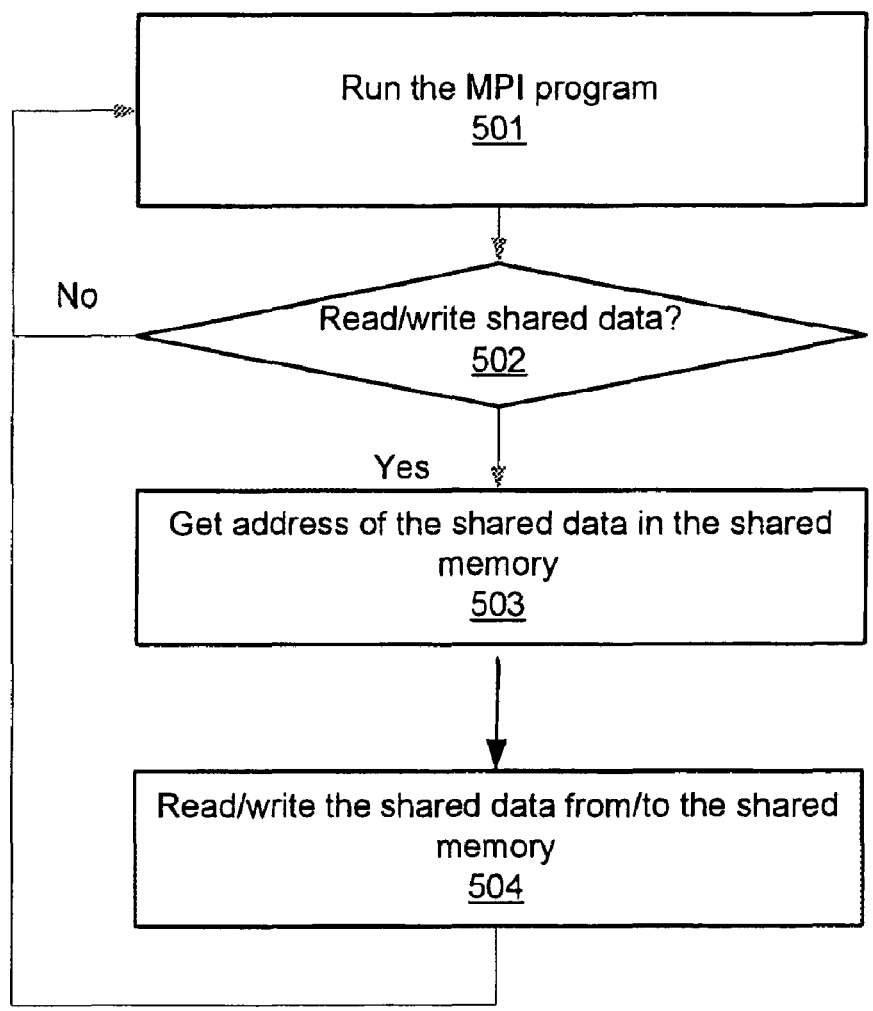
FIG. 5 illustrated an embodiment of a method of executing optimized MPI program.

FIG. 5 shows an embodiment of a method of executing optimized MPI program. In block 501, a process may run the MPI program. In block 502, it may be determined whether the MPI program instructs to read or write the shared data. If so, the process may obtain the address of the shared data in shared memory 13 in block 503. The process may obtain the address of the shared data based upon the address of buffer 130 storing the shared data that may be mapped to the process by using the library routines. In block 504, the process may read or write the shared data from or to shared memory 13.

In order to avoid data conflict, different processes may read the shared data from shared memory 13 simultaneously. However, if a process needs the shared data that is updated by another process, the process can read the shared data after the another process completes updating and writing the shared data into shared memory 13. Various mechanisms may be used to ensure that the data is accessed appropriately, for example, but not limited to, exclusive mutual access mechanisms.

Although the current invention has been described in conjunction with certain embodiments, it shall be understood that modifications and variations may be resorted to without departing from the spirit and scope of the invention as those skilled in the art readily understand. Such modifications and variations are considered to be within the scope of the invention and the appended claims.

What is claimed is:

1. A machine-readable non-transitory storage medium comprising a plurality of instructions that in response to being executed result in a system:
   during a compiling stage, retrieving shared data from a message passing interface (MPI) program, wherein the shared data is sharable by a plurality of processes;
   during a runtime stage, allocating the shared data to a shared memory, wherein the shared memory is accessible by the plurality of processes; and
   during the runtime stage, maintaining a single copy of the shared data in the shared memory so that more than one processes of the plurality of processes can read or write the single copy of the shared data from or to the shared memory.

2. The machine-readable non-transitory storage medium of claim 1, wherein the plurality of instructions further result in the system:
   annotating the shared data with a shared directive.

3. The machine-readable non-transitory storage medium of claim 1, wherein the plurality of instructions further result in the system:
   indicating a MPI communication pattern for the shared data that the more than one process of the plurality of processes can read or write the single copy of the shared data from or to the shared memory.

4. The machine-readable non-transitory storage medium of claim 1, wherein the plurality of instructions that result in the system allocating, further result in the system:
   allocating the shared data in a buffer of the shared memory; and
   mapping a memory address of the buffer to the plurality of processes.

5. The machine-readable non-transitory storage medium of claim 1, wherein the plurality of instructions further result in the system:
   determining to read or write the shared data from or to the shared memory;
   obtaining a memory address of the single copy of the shared data in the shared memory; and
   reading or writing the single copy of the shared data from or to the memory address.

6. A system, comprising:
- a retriever to, during a compiling stage, retrieve shared data from a message passing interface (MPI) program, wherein the shared data is sharable by a plurality of processes; and
- a library to, during a compiling stage, allocate the shared data to a shared memory and to maintain a single copy of the shared data in the shared memory so that more than one processes of the plurality of processes can read or write the single copy of the shared data from or to the shared memory, wherein the shared memory is accessible by the plurality of processes.

7. The system of claim 6, further comprising an annotator to annotate the shared data with a shared directive.

8. The system of claim 6, further comprising a parser to indicate the MPI communication pattern for the shared data that the more than one process of the plurality of processes can read or write the single copy of the shared data from or to the shared memory.

9. The system of claim 6, wherein the library further allocates the shared data in a buffer of the shared memory; and maps a memory address of the buffer to the plurality of processes.

10. The system of claim 6, further comprising the plurality of processes, wherein a process of the plurality of processes determines to read or write the shared data from the shared memory; obtains a memory address of the single copy of the shared data in the shared memory; and reads or writes the single copy of the shared data from or to the memory address.

11. A method:
- during a compiling stage, retrieving shared data from a message passing interface (MPI) program, wherein the shared data is sharable by a plurality of processes;
- during a runtime stage, allocating the shared data to a shared memory, wherein the shared memory is accessible by the plurality of processes; and
- during the runtime stage, maintaining a single copy of the shared data in the shared memory so that more than one processes of the plurality of processes can read or write the single copy of the shared data from or to the shared memory.

12. The method of claim 11, further comprising annotating the shared data with a shared directive.

13. The method of claim 11, further comprising indicating a MPI communication pattern for the shared data that the more than one process of the plurality of processes can read or write the single copy of the shared data from or to the shared memory.

14. The method of claim 11, wherein the allocating further comprises:
- allocating the shared data in a buffer of the shared memory; and
- mapping a memory address of the buffer to the plurality of processes.

15. The method of claim 11, further comprising:
- determining to read or write the shared data from or to the shared memory;
- obtaining a memory address of the single copy of the shared data in the shared memory; and
- reading or writing the single copy of the shared data from or to the memory address.

\* \* \* \* \*